United States Patent [19]

Azuma et al.

[11] Patent Number: 4,819,097

[45] Date of Patent: Apr. 4, 1989

[54] AUDIO SIGNAL RECORDING/REPRODUCING SYSTEM FOR USE IN TIME-LAPSE VIDEO TAPE RECORDER

[75] Inventors: Nobuo Azuma; Masaru Takahashi, both of Yokohama; Akira Shibata; Katsumi Mikamo, both of Katsuta, all of Japan

[73] Assignee: Hitachi, Ltd., Tokyo, Japan

[21] Appl. No.: 192,170

[22] Filed: May 10, 1988

[30] Foreign Application Priority Data

| May 13, 1987 | [JP] | Japan | 62-114559 |
| May 13, 1987 | [JP] | Japan | 62-114560 |
| May 15, 1987 | [JP] | Japan | 62-116812 |
| May 15, 1987 | [JP] | Japan | 62-116813 |

[51] Int. Cl.$^4$ .................. H04N 5/782; H04N 5/91
[52] U.S. Cl. ............................. 360/35.1; 360/8; 360/11.1; 360/21; 358/341
[58] Field of Search ............... 358/341, 343; 360/9.1, 360/11.1, 19.1, 32, 35.1, 8, 13, 14.1, 21

[56] References Cited

U.S. PATENT DOCUMENTS

| 3,909,512 | 9/1975 | Omori et al. ............................. 360/8 |
| 4,009,331 | 2/1977 | Goldmark et al. .................... 360/35.1 |
| 4,562,493 | 12/1985 | Nishitani et al. ....................... 360/9.1 |
| 4,607,293 | 8/1986 | Odaka et al. ............................ 360/21 |
| 4,607,294 | 8/1986 | Nishitani et al. .................... 360/35.1 |
| 4,633,332 | 12/1986 | Higurashi et al. ...................... 360/21 |
| 4,633,335 | 12/1986 | Yamamoto et al. ............... 360/11.1 |
| 4,763,206 | 8/1988 | Takahashi et al. ....................... 360/8 |

Primary Examiner—Alan Faber
Assistant Examiner—Surinder Sachar
Attorney, Agent, or Firm—Antonelli, Terry & Wands

[57] ABSTRACT

An audio signal recording/reproducing system is used in a time-lapse video tape recording device for time-lapse recording a video signal on a magnetic tape at predetermined time intervals. The audio signal recording/reproducing system comprises a memory which stores an audio signal and time-compresses the stored audio signal to output it as the time-compressed audio signal at one field period, and a magnetic head for recording the one-field period audio signal on the magnetic tape. Each of the audio signal recording tracks recorded on the magnetic tape is arranged between two adjacent video signal recording tracks. The audio signal recorded on the magnetic tape is read out by the magnetic head and stored in the memory again. The audio signal stored in the memory is expanded in its time-base to be reproduced as continuous sound.

26 Claims, 22 Drawing Sheets

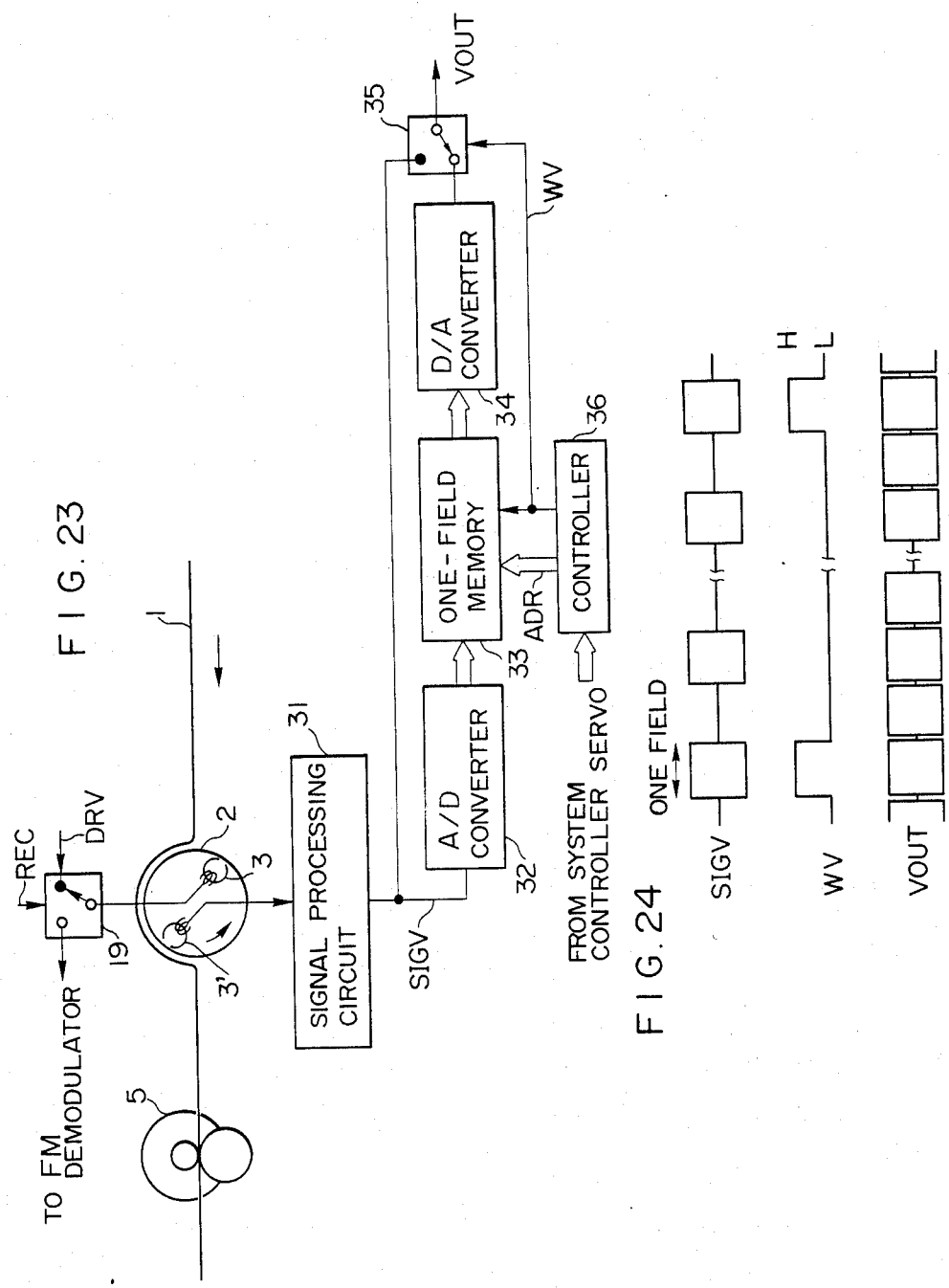

FIG. 25
FIG. 26
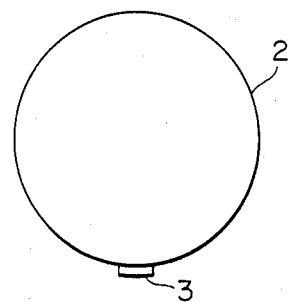
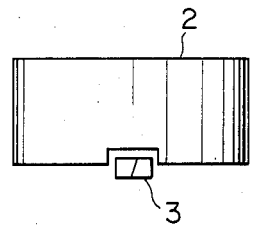
FIG. 27
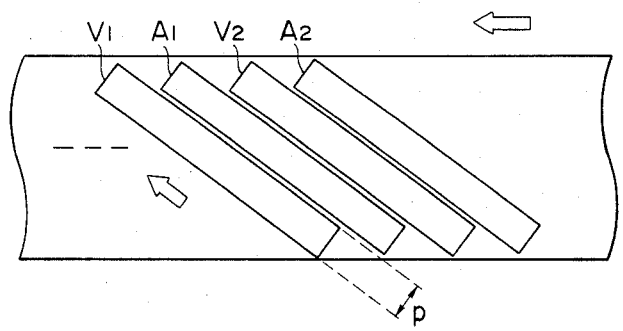
FIG. 28
FIG. 29
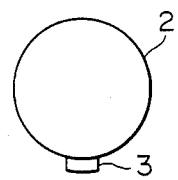
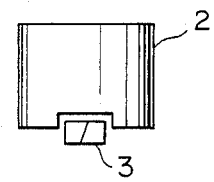

a) gv
b) DTP
c) ga

AUDIO SIGNAL RECORDING/REPRODUCING SYSTEM FOR USE IN TIME-LAPSE VIDEO TAPE RECORDER

BACKGROUND OF THE INVENTION

This invention relates to a time-lapse video tape recorder (VTR) which intermittently records video signals on a magnetic tape to record and reproduce the video signals for a long time and suitably used as a monitor device, and more particularly to an audio signal recording/reproducing system for use in such a time-lapse VTR.

Widely used as a monitor device in financial institutions, etc. is the time-lapse VTR which adopts a rotary head helical scanning system and intermittently shifts a magnetic tape to record video signals as still images one piece per several seconds thereby recording/reproducing the video signals for a long time as long as 240 hours to 480 hours. (Such a time-lapse VTR has been disclosed in, e.g. JP-A No. 58-62985.)

However, the time-lapse VTR, which intermittently shifts a magnetic tape, can not record and reproduce audio signals on the magnetic tape. More specifically, the time-lapse VTR, which intermittently repeats the travel and stop of the magnetic tape, can not disadvantageously provide a function of audio recording.

SUMMARY OF THE INVENTION

An object of this invention is to provide a time-lapse video tape recorder (VTR) which is capable of recording/reproducing high quality audio information.

In accordance with this invention, an audio signal is stored in a semiconductor memory at a certain time while a magnetic tape is being stopped. The audio signal is time-base compressed. The compressed audio signal is recorded on a magnetic tape by a rotary head (referred to a rotary audio head) which has a different azimuth angle from that of another rotary head for recording video signals (referred to a rotary video head). The tracks on which the audio signals (referred to audio tracks) are recorded are formed between the tracks on which video signals are recorded (referred to video tracks). More specifically, the time-base compressed audio signal is recorded on the audio track between two adjacent video tracks by the rotary audio head when the magnetic tape is being stopped. This operation is repeated whenever the magnetic tape is intermittently shifted. Sound is continuously recorded as successive audio signals on the audio tracks. As mentioned above, the azimuth angle of the audio tack is different from that of the video head so that any possible tracking error does not almost provide interference between the video signals and the audio signals.

If the audio head and the video head are disposed with a predetermined step therebetween, both audio track and video track can be formed during one stopping state. On the other hand, if both heads are disposed with no step therebetween, the audio signal and video track are alternately recorded every track pitch. In this case, of course, the magnetic tape is shifted at a pitch of on track. Since the audio track is formed between two adjacent video tracks, noise will be increased, in reproducing the video signals, on the way of intermittently shifting the magnetic tape. However, if the video signal is once stored in a field memory when the magnetic tape is being stopped and thereafter the stored video signal is reproduced, noise is not produced. Further, the use of the field memory permits only one rotary head to alternately form both video track and audio track every track pitch and record the corresponding video signal and audio signal thereon.

BRIEF DESCRIPTION OF THE DRAWINGS

FIG. 23 is a block diagram of the video signal circuit using a field memory;

FIG. 24 shows signal waveforms at the several points in the circuit of FIG. 23;

FIGS. 25 and 26 are a top plan view and a front view of the recording drum in a sixth embodiment of this invention;

FIG. 27 shows a pattern of the recording tracks in the sixth embodiment;

FIGS. 28 and 29 are a top plan view and a front view of a small-diameter rotary drum in the sixth embodiment;

DESCRIPTION OF THE PREFERRED EMBODIMENTS

Figure 1:
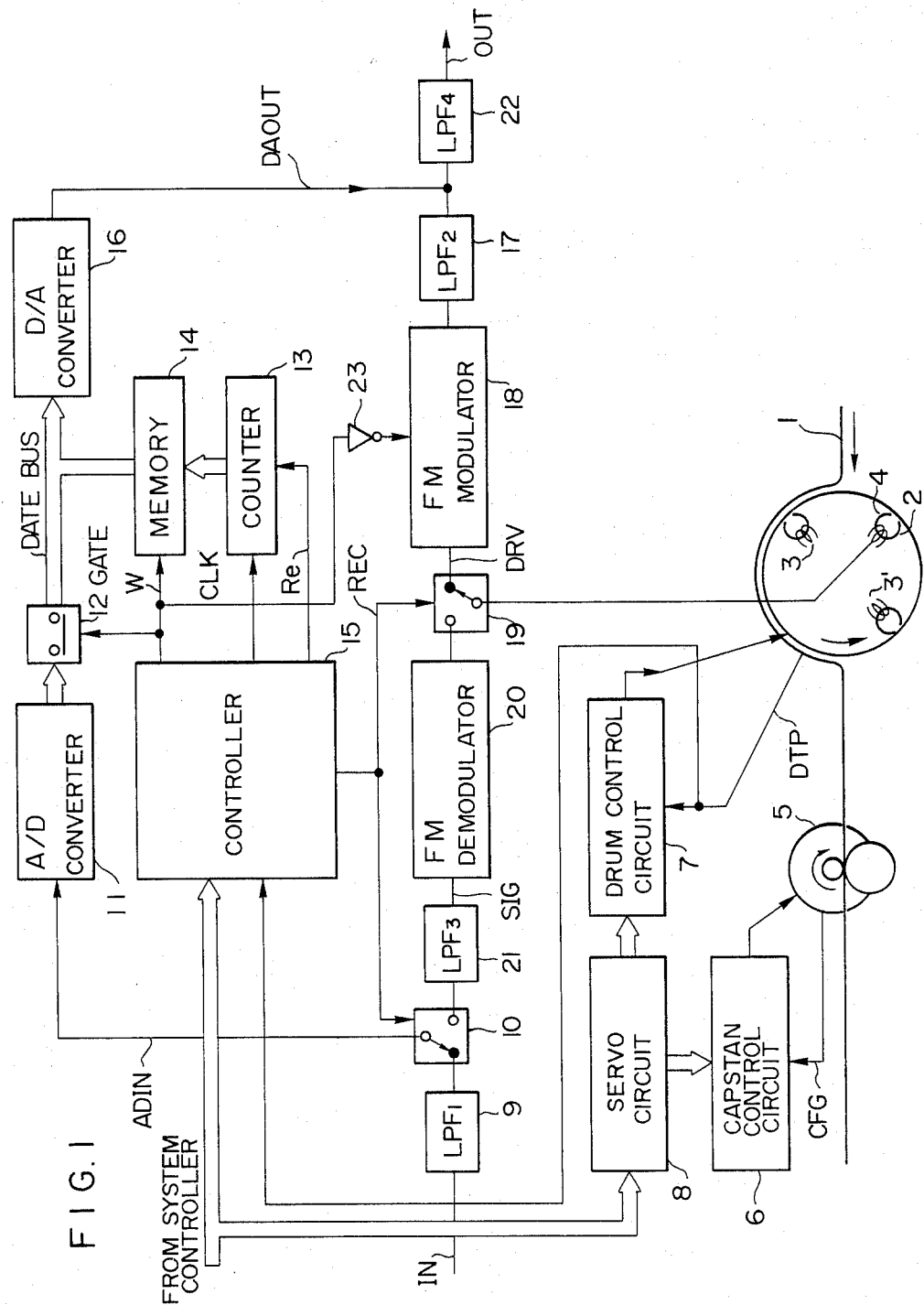
FIG. 1 is a block diagram of the time-lapse video tape recorder according to one embodiment of this invention.

FIG. 1 shows a time-lapse video tape recorder according to one embodiment of this invention in its block form. This time-lapse video tape recorder is composed of a magnetic tape 1; a rotary drum 2 on which video rotary heads 3, 3' and an audio rotary head 4 are mounted; a capstan motor 5, a capstan control circuit 6, a drum control circuit 7 for controlling the drum motor (not shown) for rotating the rotary drum 2; a servo circuit 8, a low-pass filter $LPF_1$ 9 for preventing folded noise from being generated when an input audio signal IN is converted into a digital signal; switches 10 and 19 which are switched by a recording mode signal REC; an A/D (analog to digital) converter 11 for converting the output signal ADIN from the switch 10 into a digital signal; a gate 12 for sending the output signal from the A/D converter to a data bus DATA BUS; an address counter CNT 13 for addressing a compression-expansion memory 14; a controller 15 for supplying a read/write control signal W, a clock signal CLK, a reset pulse Re, and a mode signal REC to several parts of the recorder in order to perform the time-lapse recording/reproducing of video signals and audio signals; a D/A (digital to analog) converter 16; a filter $LPF_2$ 17 for removing sampling noise; an FM modulator 18 for frequency-modulating the compressed audio signal to write it into the audio rotary head, an FM demodulator 20 for frequency-demodulating the signal obtained from the audio rotary head 4 to provide a compressed audio signal SIG; a low-pass filter $LPF_3$ 21 for preventing folded noise from being generated when the signal SIG is converted into a digital signal; a low-pass filter $LPF_4$ 22 for removing sampling noise; and an inverter 23 for inverting the read/write control signal W for the memory 14.

Figure 2:
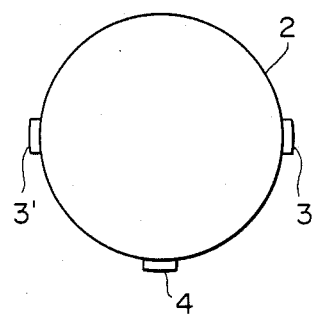
FIG. 2 is a top plan view of the rotary drum in FIG. 1.
Figure 3:
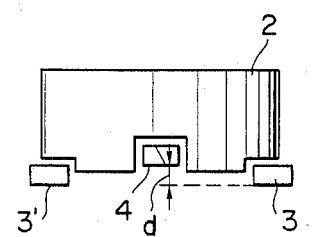
FIG. 3 is a front view of the rotary drum in FIG. 1.
Figure 4:
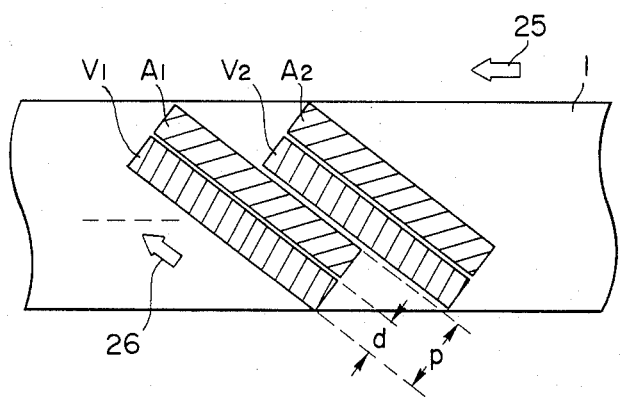
FIG. 4 shows a pattern of the recording tracks formed on a magnetic tape by the rotary head in FIG. 2.

FIGS. 2 and 3 show the rotary drum 2 in its top plan and its front, respectively. In the embodiment of FIG. 1, the video rotary heads 3 and 3' have a gap with the same azimuth angle and the audio rotary head 4 has a gap with a different azimuth angle from that in the heads 3 and 3'. The video rotary heads 3 and 3' are located at the same height, i.e. with no step or level difference therebetween and the audio rotary head 4 is located with a predetermined step d from the heads 3 and 3' as seen from FIG. 3. FIG. 4 shows a pattern of the recording tracks of the signals recorded by the video heads 3, 3' and the audio head 4 on the magnetic tape 1. The magnetic tape 1 is intermittently shifted by one track pitch P in the direction of an arrow 25 and an audio signal recording track $A_1$ (simply referred to an audio track) is formed at a guard band portion between one video signal recording track (simply referred to as a video track) $V_1$ and another adjacent video signal recording track $V_2$. The width of the heads 3,3' and 4 is set to be approximately half of the track pitch P and also the step d is set to be approximately half thereof. The tracks $V_1$ and $A_1$ are formed when the magnetic tape 1 is being stopped. Incidentally if the size of the head width and step is made twice as long as in the above case and the magnetic tape 1 is intermittently shifted by two track pitches 2P, the audio track and the video track can be formed by one track pitch, respectively.

Figure 5:
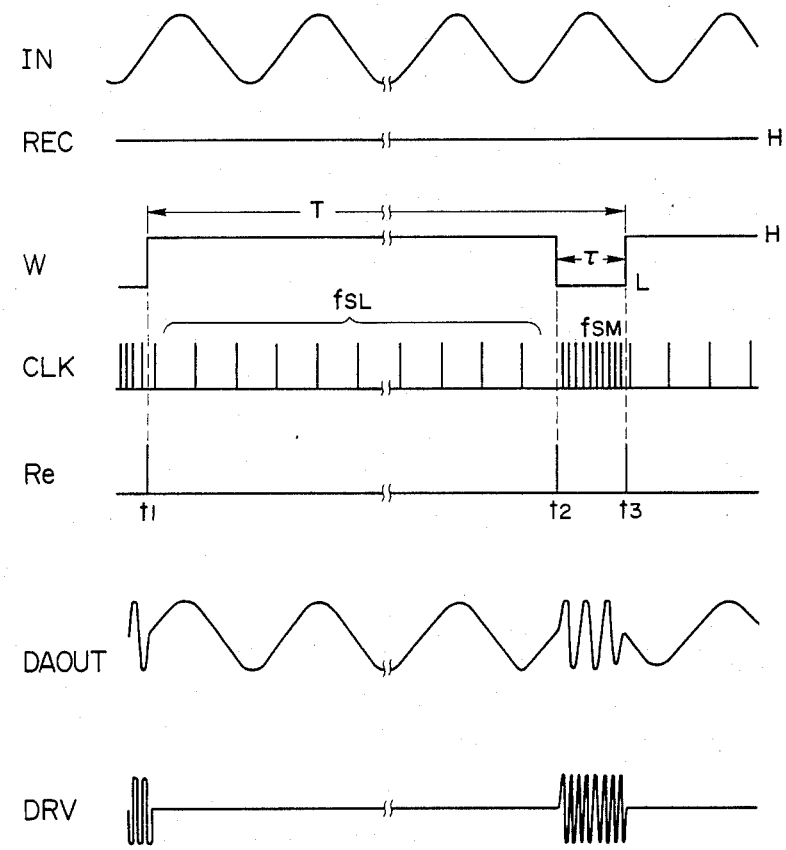
FIG. 5 shows signal waveforms at several points in recording signals.

The operation of the time-lapse VTR of this invention will be explained with reference to FIG. 1, FIG. 4 and FIG. 5 showing the signal waveforms at the several points in the block diagram of FIG. 1.

The capstan control circuit 6, which is controlled by the servo circuit 8, intermittently drives the capstan motor 5 so that the video track and audio track can be formed on the magnetic tape in one track pitch by a predetermined time. The capstan control circuit 6 counts the signals CFG produced from a frequency generator (not shown) generating rotation information provided in the motor 5, thereby providing shift information corresponding to one track pitch. When the magnetic tape 1 is being stopped, the video head 3 forms the video track $V_1$ on the magnetic tape 1 and the audio head 4 forms the audio track $A_1$ thereon. When the magnetic tape 1 is intermittently shifted by one track pitch P, the video rotary head 3 or 3' forms the track $V_2$ and the audio rotary head 4 forms the track $A_2$. Thereafter, the same operation is repeated. Also in re-producing the recorded signals, the magnetic tape 1 is intermittently shifted. When the magnetic tape 1 is being stopped, the video rotary heads 3 or 3', both of which have a gap with the same azimuth angle as mentioned above, scans e.g. the video track $V_1$ to reproduce the video signal and the audio head 4 reproduces the audio signal from, e.g. the audio track $A_1$.

The operation in recording the audio signals will be explained. An input audio signal IN is sent to the A/D converter 11 through the low-pass filter $LPF_1$ 9 and the switch 10 and is converted into a digital signal (e.g. four bits). As shown in FIG. 5 during the period when the read/write control signal W is at a high level "H", the clock signal CLK is at a low frequency ($f_{SL}$). During the period, the digitized audio signal passes through the gate 12 and stored in the memory 14 through the data bus DATA BUS. The read/write control W supplied from the controller 15 to the memory 14 becomes high "H" at a time $t_1$. The signal W have the same as the period of the intermittent shift of the magnetic tape 1. At a time $t_2$, the controller 15 produces a reset pulse Re to initialize the address counter 13. Between times $t_1$ and $t_2$, the magnetic tape 1 is shifted by one track pitch P and stopped. During the period $(T-\tau)$ the read/write control signal remains high "H", the audio signal is stored in the memory 14 by the low frequency clock signal ($f_{SL}$) During the period $\tau$ when the control signal W is low "L", the audio signal is read out from the memory 14. Then, the audio signal is time-base compressed (hereafter simply referred to time-compressed). The time - compressed audio signal is sent to the D/A converter 16 through the data bus DATA BUS. More specifically, at the negative-going edge of the read/write control signal W, the address counter 13 is reset again and initialized. During the period $\tau$, the clock signal CLK is compressed $T/\tau$ times to have a frequency $f_{SH}$. The compression ratio $T/\tau$ corresponds to $f_{SH}/f_{SL}$.

The time-base compressed audio signal is converted into an analog signal DAOUT by the D/A converter 16. The analog audio signal is sent to the FM modulator 18 through the low-pass filter $LPF_2$ 17 and frequency modulated into a signal DRV there. The signal DRV is sent to the audio head 4 through the switch 19. Since an inverted signal of the control signal W is sent to the FM modulator 18 through the inverter 23, a recording current is supplied to the audio head 4. The period $\tau$, which corresponds to one field period of an image, is equal to the period V of a vertical synchronizing signal (1/59.94 sec. in the NTSC color system).

The process of forming the video tracks and the audio tracks will be explained. When the magnetic tape is being stopped, the video signal is recorded on the video track $V_1$ by the video rotary head 3 prior to the period $\tau$ and then the time-base compressed audio signal is recorded on the audio track $A_1$ by the audio rotary head 4. Thereafter, the magnetic tape 1 is intermittently shifted by one track pitch P and the video track $V_2$ and the audio track $A_2$ are formed. Incidentally, the read/write control signal W is formed on the basis of a tack signal DTP for detecting the rotating phase of the rotary heads.

Figure 6:
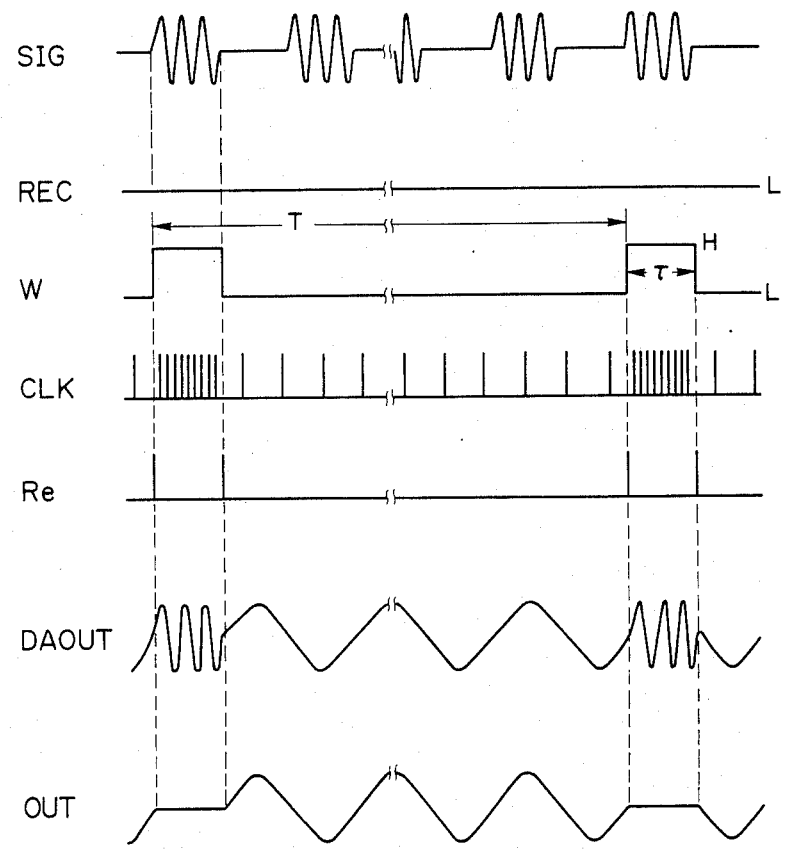
FIG. 6 shows signal waveforms at several points in reproducing signals.

Referring to the signal waveform chart of FIG. 6, explanation will be given for the process of expanding the compressed audio signal to restore it as continuous sound. When the audio signal is reproduced, the mode signal REC is high "H". When the audio rotary head 4 is located on the track $A_1$ in FIG. 4, the compressed audio signal is sent to the FM demodulator 20 through the switch 19 (white point side) and frequency-demodulated there to provide a base band signal SIG. The SIG is sent to the A/D converter 11 through the switch 10 and converted into a digital signal. When the audio rotary head is located on the track $A_1$, the controller 15 supplies a reset pulse Re to the address counter 13 to initialize it. Then, during the period $\tau$ when the control signal W remains high "H", the compressed audio signal corresponding to one field period of an image is stored in the memory 14 through the data bus DATA BUS by a high frequency clock $f_{SH}$. When the control signal becomes low "L", the magnetic tape 1 is intermittently shifted by one track pitch P. Then, the reset pulse Re is supplied to the address counter 13 and the audio signal stored in the memory 14 is read out from a first address by a low frequency clock signal $f_{SL}$. Thus, the audio signal is expanded and the expanded audio signal is sent to the D/A converter 16 through the data bus DATA BUS. The above operation is repeated at the period of T. Thus, the compressed signal is expanded and continuously restored as an audio signal DAOUT as seen from FIG. 6. The audio signal DAOUT, after its unnecessary signal part during the period $\tau$ is eliminated, is produced as an output signal OUT. In the case where the magnetic tape for two-hour recording mode in the VHS color system is used, the compressed sound is recorded at intervals of four seconds, thus providing 480 hour recording with the compression ratio of 1/240.

Figure 7:
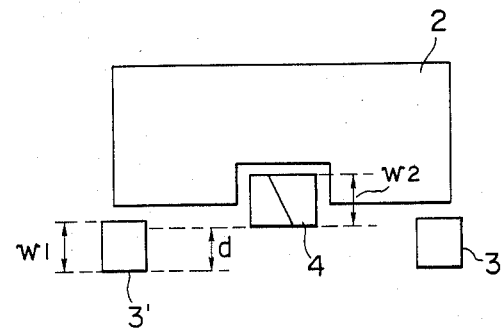
FIG. 7 is a front view of the rotary drum in a second embodiment of this invention.
Figure 8:
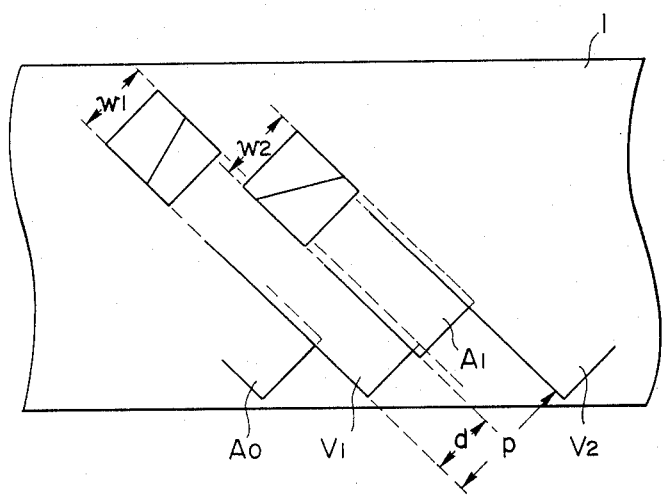
FIG. 8 shows a pattern of the recording tracks in the second embodiment of this invention.

A second embodiment of this invention will be explained with reference to FIGS. 7 and 8. In this embodiment, the head width of the rotary heads is set to $W_1$ and $W_2$ which are slightly longer than half of the track pitch P. If the video heads 3 and 3' having a head width $W_1$ and the audio head 4 having a head width $W_2$ are arranged with a step or level difference d therebetween as shown in FIG. 7, the pattern of the recording tracks is formed as shown in FIG. 8. If $W_1=30$ $\mu$m, $W_2=30$ $\mu$m and d=29 $\mu$m (i.e. P=58 $\mu$m) in the heads in the VHS color system, an overlap portion of 1 $\mu$m is produced between the adjacent two tracks. Thus, the track width of the tracks $V_1$ and $A_1$ actually used for recording will be 29 $\mu$m.

Figure 9:
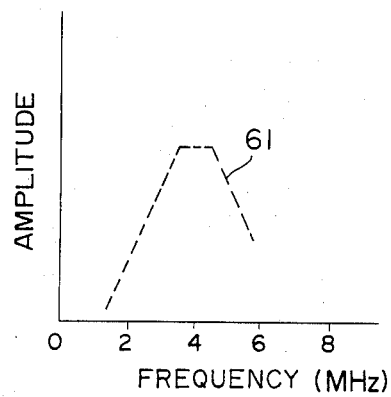
FIGS. 9 to 12 are graphs showing audio recording allocation characteristics.
Figure 11:
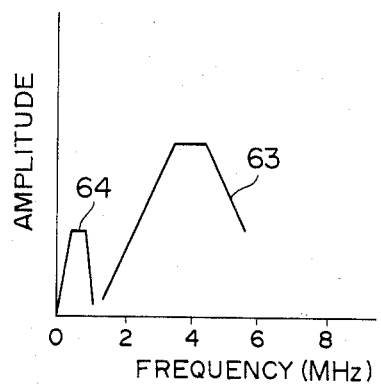
Figure 12:
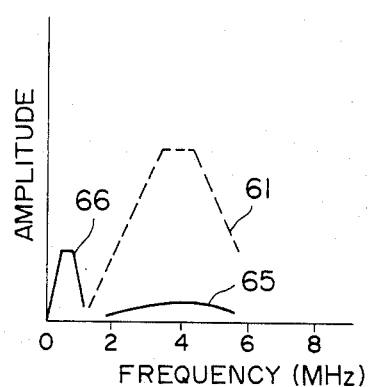

In the region of the track $A_0$ or $A_1$ shown in FIG. 8, only the frequency modulated audio signal with a center frequency of 3.9 MHz as shown by a dotted line 61 in FIG. 9 is recorded. In the overlap region between the track $A_0$ and the track $A_1$ both of a frequency modulated chrominance signal 63 with a center frequency of 3.9 MHz and a low-pass transformed color signal 64 with a center frequency of 629 KHz are recorded as shown by solid lines 63 and 64 in FIG. 10, respectively. The audio signal is a high frequency signal so that it will be greatly attenuated as indicated by a dotted line 62 in FIG. 10. In the region of the track $V_1$, only the video signals are recorded as indicated by the solid lines 63 and 64 in FIG. 11. In the overlap range between the track $V_1$ and the track $A_1$, the audio signal indicated by 61 is superposed on the video signals as shown in FIG. 12. In this case, the chrominance signal is greatly attenuated as indicated by a solid line 65, but the color signal is not almost attenuated by a solid line 66 since it is a low frequency signal.

Figure 10:
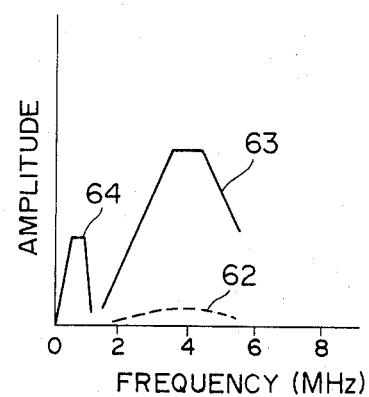

Thus, by using the heads with a head width larger than half of the track pitch P, the video tracks and audio tracks can be arranged on the magnetic tape 1 without any opening. Therefore, any possible head tracking error in reproducing the signals does not hinder the signals being completely reproduced. Also, the interference signal from the adjacent tracks can be negligibly attenuated as shown in FIGS. 10 and 12 since the azimuth angle ($-6°$) in the video heads and that ($30°$) in the audio head are different from each other.

Figure 13:
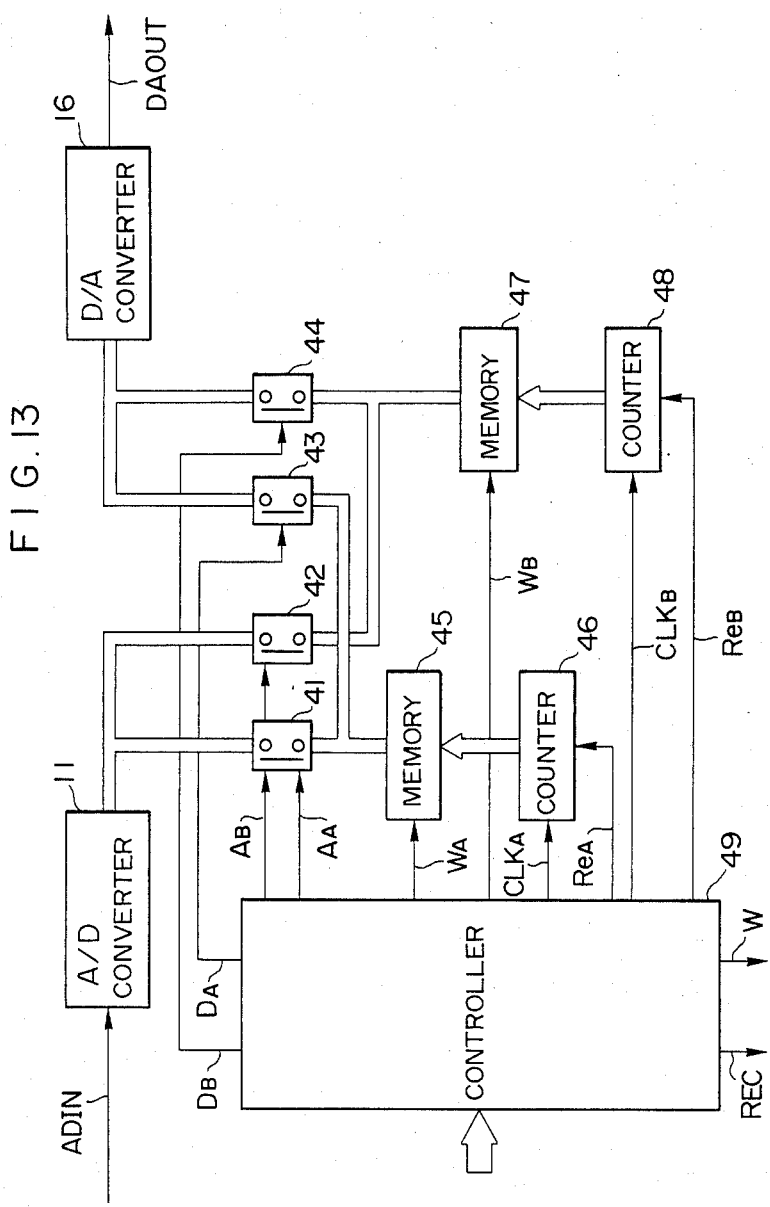
FIG. 13 is a block diagram of the time-lapse video tape recorder according to a third embodiment of this invention.

A third embodiment of this invention will be explained with reference to FIG. 13. This embodiment intends to compensate for the lack of audio information.

Figure 14:
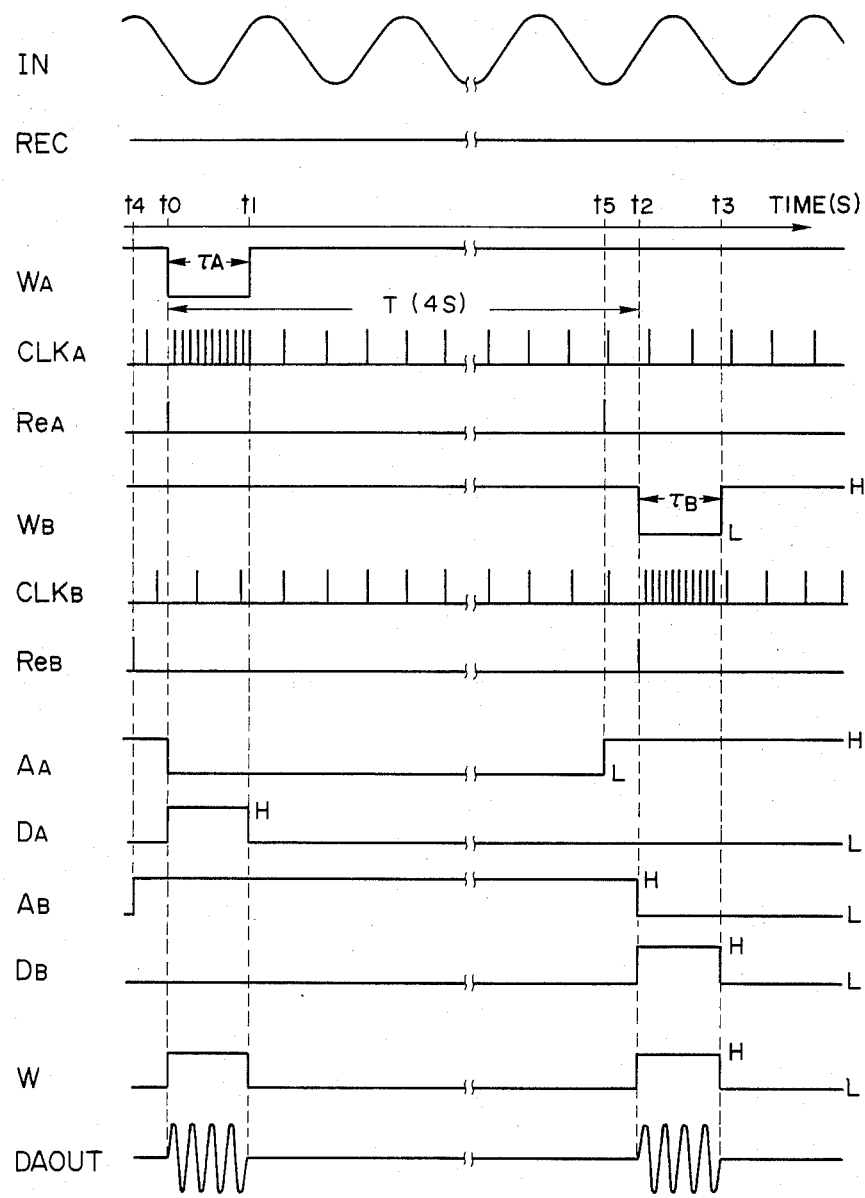
FIGS. 14 and 16 show signal waveforms at several points in the third embodiment.
Figure 15:
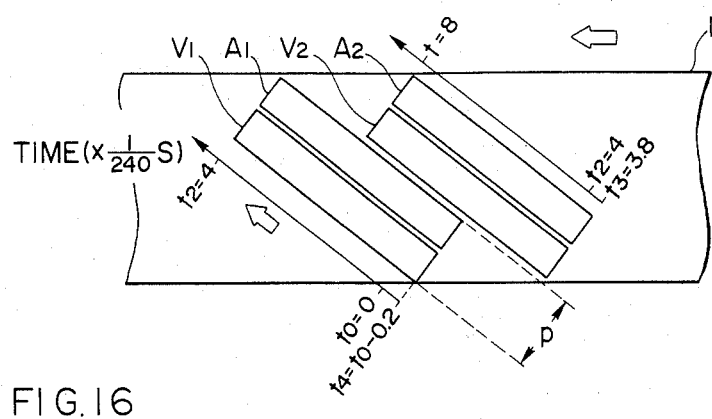
FIG. 15 shows a pattern of the recording tracks in the third embodiment.

The operation of FIG. 13 will be explained referring to the signal waveform chart of FIG. 14 and the recording pattern diagram of FIG. 15. An input audio signal ADIN is passed through the A/D converter 11 and a gate circuit 41 and is stored in a memory 45 by a low frequency clock signal CLK (frequency $f_{SL}$) during the period when a memory control signal $W_A$ is high "H". (It is assumed that the period of the intermittent shift is set to 4 sec. from the time $t_0$ of the negative going edge of the control signal). A compressed audio signal is read out from a memory 47 during the period $\tau_B$ between times $t_2$ and $t_3$ and recorded on the audio track $A_1$ in FIG. 15. During this period, the input audio signal remains stored. Therefore, as in the embodiment of FIG. 1, the lack of the audio signal does not occur during the period $\tau_B$.

Figure 16:
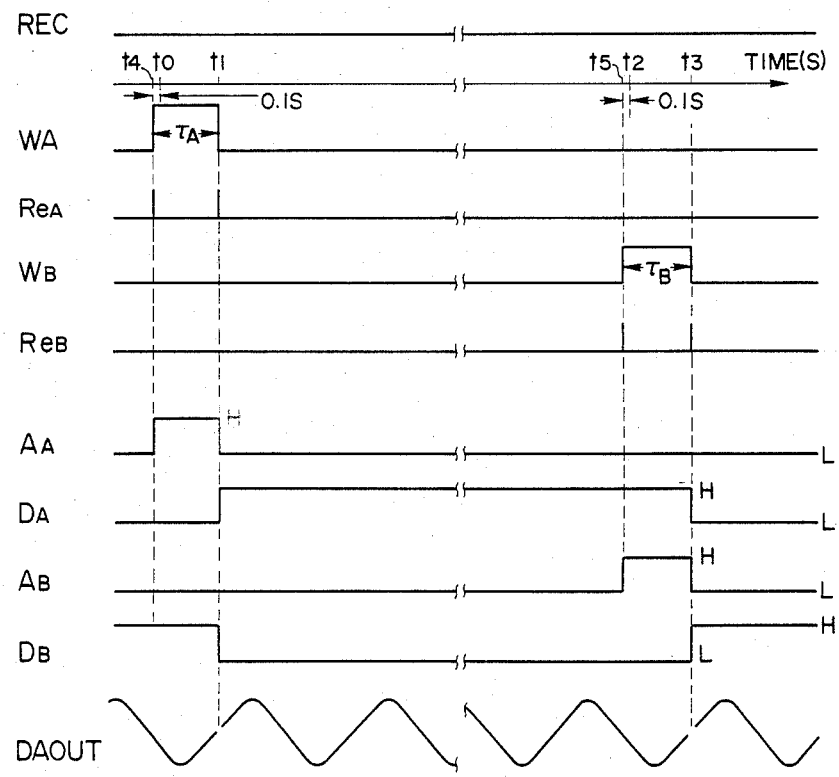

An address counter 48 for the memory 47 is reset at time $t_4$ ($=t_0-0.2$ sec.), and the input audio signal is stored during the period from time $t_4$ to $t_2$ ($=t_0+4$ sec.). At the time $t_2$, a reset pulse $R_{eB}$ is supplied to the address counter 48, and the audio signal from $t_4$ to $t_2$ is read out during the period $\tau_B$ and recorded on the track $A_0$ as shown in FIG. 16. The audio signal is time-base compressed with the compression ratio of 1/240. At the time $t_5$ ($=t_0+3.8$ sec.), the address counter 46 is reset, the input audio signal from $t_5$ to $t$ ($=t_2+4$ sec) is stored in the memory 45 and thereafter recorded on the track $A_2$ as shown in FIG. 15 after the magnetic tape 1 is intermittently shifted. Since both of the memories 45 and 47 write or read the data during the period $\tau_A$ and $\tau_B$, gate circuits 41 to 44 are on-off controlled by control signals $A_A$, $D_A$, $A_B$ and $D_B$. The information DAOUT which is supplied during the period when the control signal is high "H".

The operation of reproducing the audio signal with be explained with reference to the signal waveform chart of FIG. 16. The compressed audio signal IN reproduced from the audio head, after the address counter 46 or 48 is reset, is stored in the memory 45 or 47 by a high frequency clock signal $f_{SL}$ through the A/D converter 11 and the gate circuit 41 or 42. After the address counter 46 or 48 is reset again and initialized, the audio signal is read out from the memory 45 or 47 by a low frequency clock $f_{SL}$ and is output as an output signal through the gate 43 or 44. If the time $t_0$ shown in FIGS. 15 and 16 is assumed to be a reference time, the audio signal including the part corresponding to excess 0.2 sec. is recorded on the track $A_0$. Thus, the audio signal from $t_4 (=t_0-0.1$ sec$)$ to $t_5 (=t_0+3.9$ sec$)$ is stored in the memory 45 by the high frequency $f_{SH}$ during the period $\tau_4$ when the control signal WA is high "H". The audio signal from $-0.1$ (sec) to 3.9 (sec) is produced from DAOUT during the period when the control is low "L", and the control signal is high "H". Stored from the next track $A_2$ the audio signal from $t_5$ $(=t_0+4-0.1$ sec$)$ to $t_3$ is stored in or read out from the memory 47 and the audio signal from 3.9 sec to 7.9 sec is produced from DAOUT. Thus, the audio signal DAOUT is produced without any lack as shown in FIG. 16.

Figure 17:
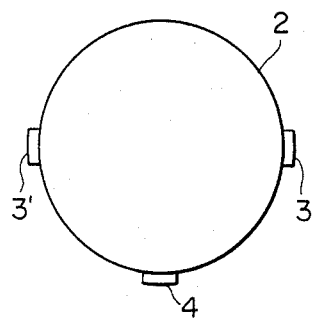
FIGS. 17 and 18 are a top plan view and a front view of the recording drum in a fourth embodiment of this invention.
Figure 18:
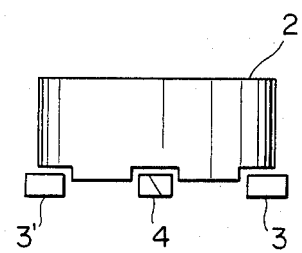
Figure 19:
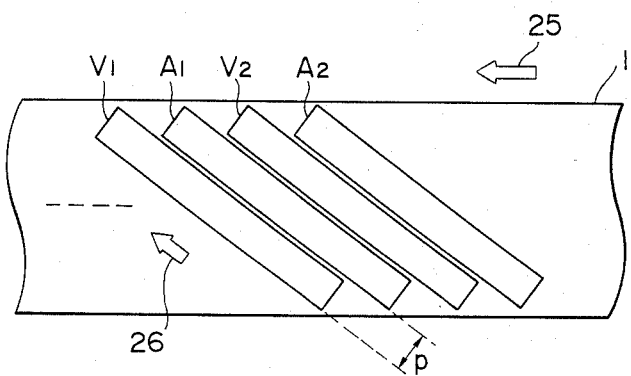
FIG. 19 shows a pattern of the recording tracks formed by the rotary head in FIG. 17.

A fourth embodiment of this invention in which the video heads and the audio head are located at the same height will be explained. FIGS. 17 and 18 show the rotary drum 2 in its top plan and its front, respectively. The video heads 3 and 3' have a gap with the same azimuth angle and the audio head 4 has a gap with a different azimuth angle from that in the video heads 4. These three heads are provided in the rotary drum with the same height (i.e. no step or level difference there among). FIG. 19 shows a pattern of the recording tracks formed by the heads 3, 3' and 4. The magnetic tape 1 is intermittently shifted in the direction of an arrow 25 at intervals of one track pitch P as shown (0.5 track pitch may be adopted), and the video tracks $V_1$, $V_2$,—and the audio tracks $A_1$, $A_2$,—each having a width of one track pitch P are alternately formed in the sequence of $V_1$, $A_1$, $V_2$, $A_2$,—. An arrow 26 indicates the scanning direction of the heads 3, 3' and 4.

The operation of reproducing a video signal and an audio signal is as follows. First, when the magnetic tape 1 is being stopped, the video head 3 or 3' are rotated to read out the video signal recorded on the video track $V_1$. Next, the magnetic tape 1 is intermittently shifted by one track pitch P and the time-base compressed audio signal is read out by the audio head 4. Further, the magnetic tape 1 is intermittently shifted again and the video signal is read out from the track $V_2$ by the head 3 or 3'. The audio signal is recorded and reproduced in the same manner as in the first embodiment of this invention.

Figure 20:
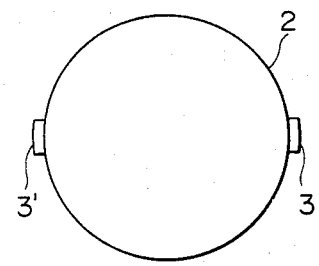
FIGS. 20 and 21 are a top plan view and a front view of the recording drum in a fifth embodiment of this invention.
Figure 21:
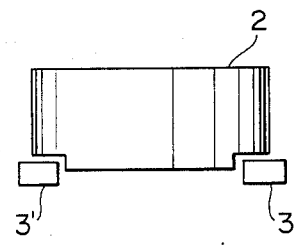
Figure 22:
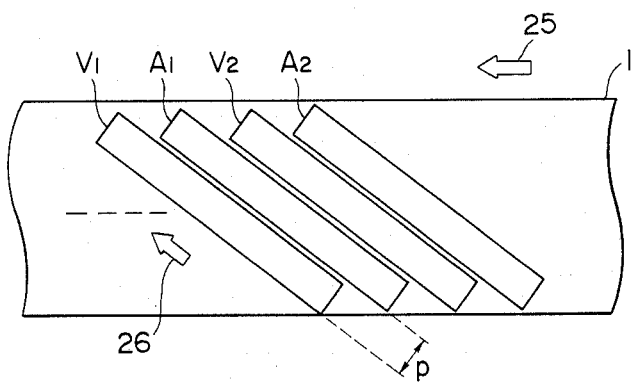
FIG. 22 shows a pattern of the recording tracks in the fifth embodiment.

A fifth embodiment of this invention in which a one-field memory for storing video signals is used will be explained. FIGS. 20 and 21 show a rotary drum 2 in its top plan and its front, respectively. FIG. 22 shows a recording track pattern formed in this embodiment. Since less number of the heads results in a more simple device structure, the video head 3 is also used as the audio head. In this case, the magnetic tape 1 is intermittently shifted in recording/reproducing the signals in the same manner as the fourth embodiment of this invention shown in FIGS. 17 to 19. If the heads 3 and 3' have a gap with the same azimuth angle, the cross talk between adjacent tracks can be prevented by setting the head width to be smaller and by providing a guard band between the adjacent tracks. The video signal and audio signal which are supplied to the head 3 are switched by a switch.

In the case where the heads 3 and 3' have a gap with a different azimuth angle from each other, the video signal recorded on the video track $V_1$ can be reproduced by the head 3 but not reproduced by the head 3', which results in a lack of the video signal for each field. This problem can be solved by the provision of a video signal reproducing circuit as shown in FIG. 23.

As seen from FIG. 23, this circuit is composed of a video signal processing circuit 31, an A/D converter 32, a one-field memory 33, a D/A converter 34, a switch 35 which is connected with a contact indicated by a black point when a video write control signal WV is high "H", and a controller 36 for producing an address signal ADR and the control signal WV controlling the one-field memory 33 and the switch 35, respectively.

The function of this circuit will be explained referring to the signal waveform chart of FIG. 24. In the case where the video signal recorded on, e.g. the track $V_1$ is reproduced, the output signal SIGV from the signal processing circuit 31 has a lack for each field as shown in FIG. 24. In this embodiment, after the magnetic tape 1 is intermittently shifted and stopped, the control signal WV is once made high "H" during one field, the video signal corresponding to one field period digitized by the A/D converter 32 is stored in the one-field memory 33. Thereafter, when the control signal WV is made low "L", the video signal is read out from the one-field memory 33, thus providing a continuous video signal VOUT through the D/A converter 34 and the switch 35.

Incidentally, during the period when the signal SIGV is stored in the one-field memory 33, the signal SIGV from the signal processing circuit 31 is output through the switch 35 connected with a black point.

A sixth embodiment of this invention in which only one rotary head is used with a one-field memory. FIGS. 25 and 26 show a rotary drum 2 in its top plan and its front in this embodiment. FIG. 27 shows a recording track pattern in this embodiment.

In this embodiment, the recording head is also used as an audio head. In operation, after the track $V_1$ is formed by the head 3, the magnetic tape 1 is shifted by one track pitch and then the track $A_1$ is formed by the head 3. Thereafter, the magnetic tape is shifted by one track pitch and the track $V_2$ is formed after a predetermined time. In reproducing the signals, the one-field memory 33 as shown in FIG. 23 is used. Thus, the video signals recorded on the tracks $V_1$ and $V_2$ are reproduced as a continuous signal in the same manner as the previous embodiment.

Further, the recording track pattern as shown in FIG. 27 can be also formed by setting the rotary drum diameter to 1/n (n is positive number) of that in FIGS. 25, 26 and 27, the tape winding angle to n times and the rotating number of the rotary drum to n times. In this case, this embodiment can be implemented by the device with a small diameter rotary drum and only one head, thereby providing a minuaturized time-lapse VTR.

Figure 30:
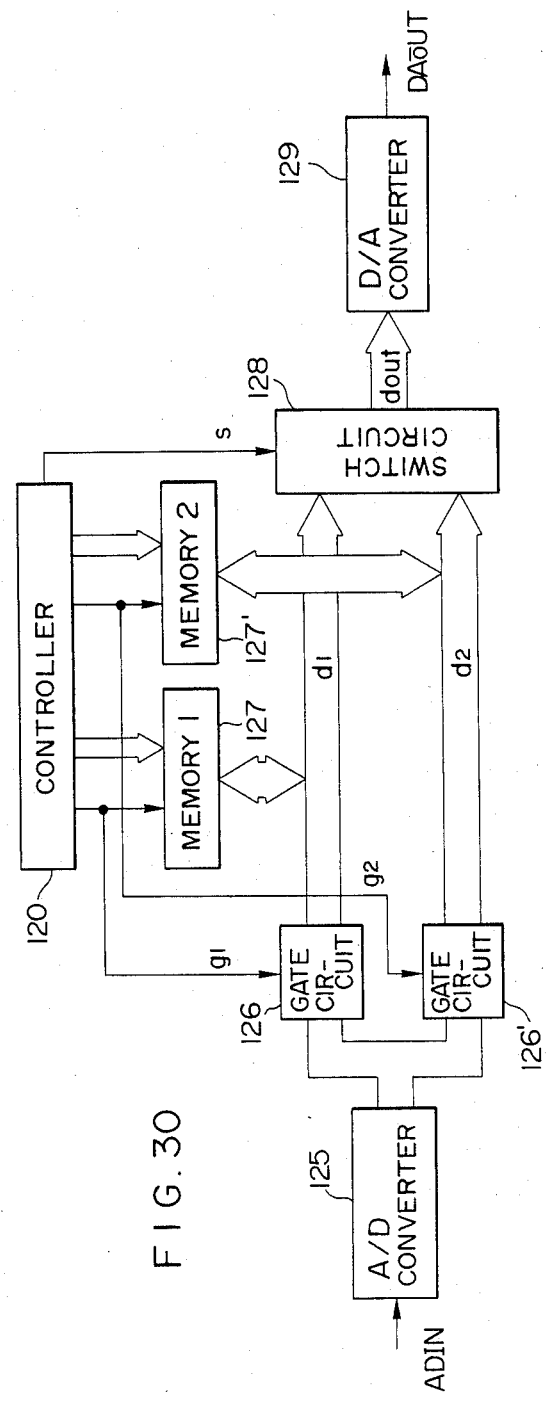
FIG. 30 is a detailed block diagram of the time compression circuit in a seventh embodiment of this invention.

A seventh embodiment of this invention will be explained. This embodiment intends to prevent the lack in the audio signal by different means from in the third embodiment. To this end, there is provided means for producing a time-base compressed signal of an input audio signal longer than a predetermined time interval of the intermittent shift of the magnetic tape and this time-base compressed audio signal is recorded on an audio track. Such a function will be explained with reference to FIG. 30. FIG. 30 shows only the part corresponding to the controller 15, memory 14, A/D converter 11 and D/A converter 16 shown in FIG. 1 (The remaining parts are entirely the same as those in FIG. 1).

An audio input signal ADIN is sent to gate circuits 126 and 126' through an A/D converter 125. The output signal from the gate circuit 126 is sent to a data I/O terminal of a first memory 127 and a switching circuit 128. The output signal from the gate circuit 126' is sent to a data I/O terminal of a second memory 127'. The output signal from the switching circuit 128 is produced as an audio output signal DAOUT through a D/A converter 129. The construction and operation successive to the input signal ADIN and the output signal DAOUT is the same as those in FIG. 1. A controller 120 supplies control signals to the gate circuits 126, 126', the memories 127, 127' and the switching circuit 128.

Figure 31:
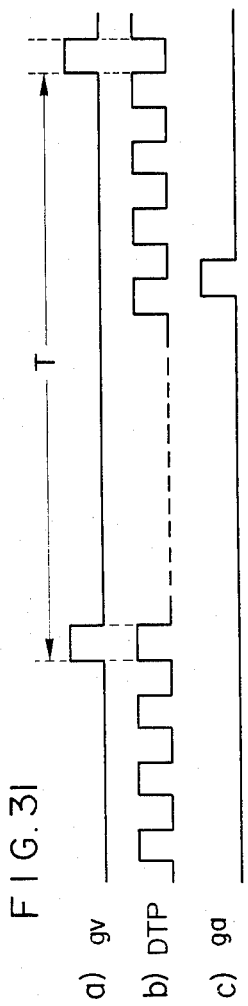
FIGS. 31 and 32 are timing charts of the operation in the circuit of FIG. 30.

The operation of the seventh embodiment will be explained. FIG. 31 shows a timing chart of the control signals.

A video signal is sampled at regular intervals by a control signal $g_v$ and recorded on a magnetic tape. On the other hand, an audio signal is time-compression recorded on the magnetic tape using a control signal $g_a$ The control signals $g_v$ and $g_a$, created on the basis of a signal in synchronism with the rotation of the rotary drum 2 shown in FIG. 1, have the same period 7 and out of phase. Thus, the time-compressed and the video signal are recorded, with the same period, on the magnetic tape. The time-compressed audio signal is recorded, after the video signal, during the period when the magnetic tape is being stopped. Thus, the audio track as shown in FIG. 4 is formed.

Figure 32:
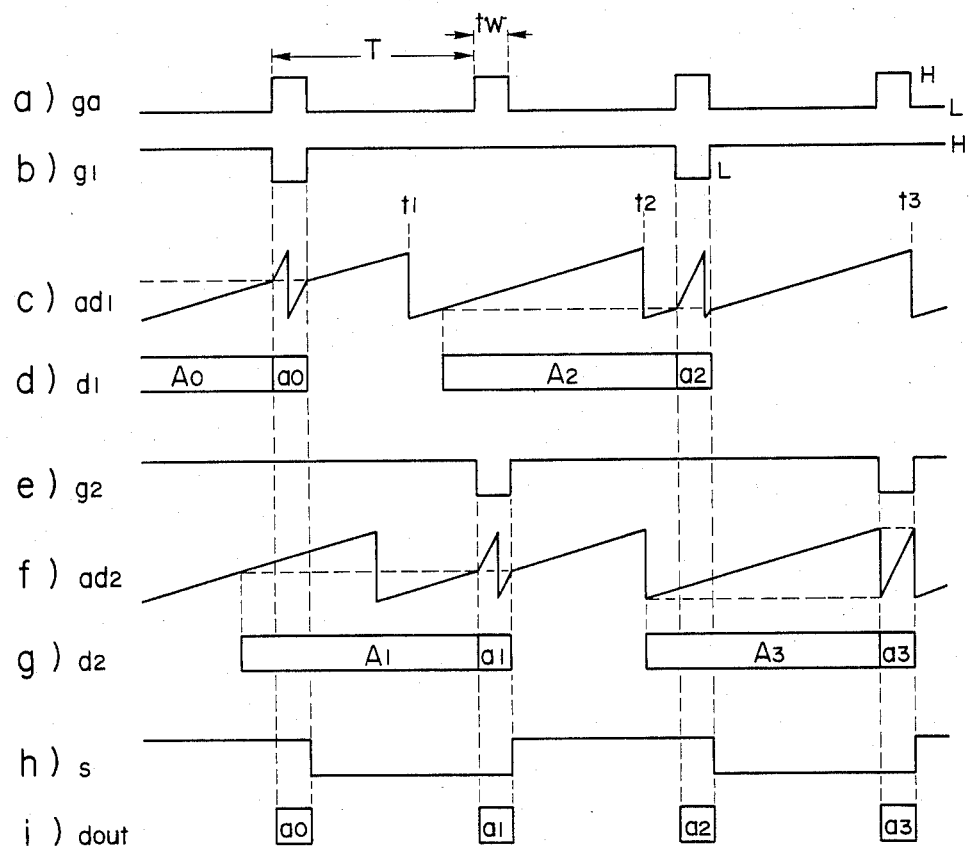

The circuit of FIG. 30 produces the time compressed audio signal DAOUT in synchronism with the control signal $g_a$. FIG. 32 shows a timing chart of this operation.

The input audio signal ADIN is converted into a digital signal by the A/D converter 125. The audio digital signal is supplied to the first memory 127 and the second memory 127' through the gate circuits 126 and 126' respectively. The controller 120 supplies a memory control signal $g_1$ and an address signal $ad_1$ to the first memory 127. The memory control signal $g_1$ has a period twice as long as that of the control signal $g_a$. The first memory 127 writes in data during the period when the memory control signal $g_1$ is high "H", and reads out the data when it is low "L". The gate circuit 126, to which the memory control signal is also supplied, prevents the output data from the A/D converter 125 from being supplied to the first memory 127 when the first memory 127 is reading out the data. The address signal $ad_1$ causes the counters (not shown) for the memories 127, 127' to be counted up at a low speed when $g_1$ is high "H" and at a high speed when $g_1$ is low "L". When the counters are counted up to a maximum number, they return the count value to zero at times $t_1$, $t_2$, and $t_3$ as shown in c) of FIG. 32. As shown in d) of FIG. 32 as the data $d_1$ supplied to the data I/O input terminal of the first memory 127, the input data during the period $A_0$ appears as a time-compressed data during the period $a_0$ and the input data during the period $A_2$ appears as a time-compressed data during the period $a_2$.

On the other hand, a memory control signal $g_2$ and an address signal $ad_2$ as shown in e) of FIG. 32 and f) are supplied to the gate circuit 126' and the second memory 127'. The memory control signal $g_2$ also has a period twice as long as that of the control signal $g_a$ As shown in (g) of FIG. 32 as the data $d_2$ supplied to the data I/O input terminal of the second memory 127', the input data during the period $A_1$ appears as a time-compressed data during the period $a_1$ and the input data during the period $A_3$ appears as a time-compressed data during the period $a_3$. These data $d_1$ and $d_2$ are alternately exchanged, in a exchange circuit 128, by an exchange control signal S as shown in (h) of FIG. 32, thus providing an output data $d_{out}$ shown in (i) of FIG. 32. The output data $d_{out}$ is converted into an analog signal in the D/A converter 129, which is output as the time-compressed audio output signal DAOUT in synchronism with the control signal $g_a$.

Now, it is assumed that the speed ratio $\beta$ of the high speed count-up by the address signal $ad_1$ to the low speed count-up by the address signal $ad_2$ is $$\beta = T/t_w$$

where T is the period of the control signal $g_a$ and $t_w$ is the pulse width of $g_a$. Then, as shown in FIG. 32, the content of the time-compressed audio signal generated at a time is longer than its generating period. Therefore, the information recorded on the time-compressed audio tracks has an overlap portion between the adjacent tracks.

Since the information at the interface between a certain time-compressed audio signal and a subsequent time-compressed audio signal is doubly recorded, any lack in the audio signal does not occur at the interface.

Figure 33:
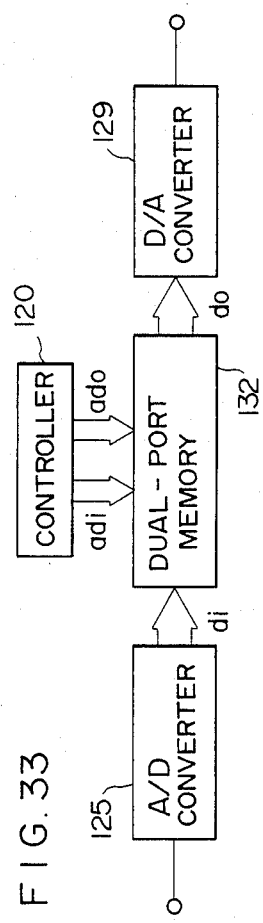
FIG. 33 is a detailed block diagram of the time compression circuit using a dual port memory.
Figure 34:
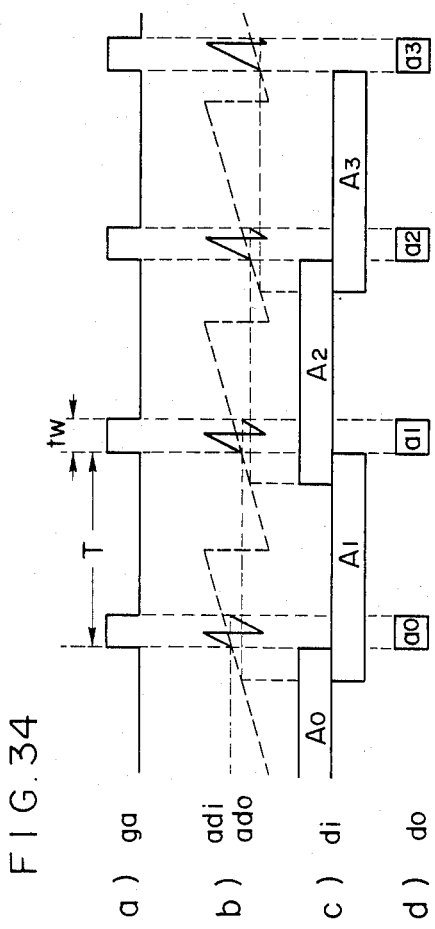
FIG. 34 is a timing chart of the operation of the circuit of FIG. 33.

In an alteration of this embodiment, as shown in FIG. 33, a dual-port memory 132 may be used in place of the memories 127 and 127'. In this case, the output signal $d_i$ from the A/D converter 125 is input to a data input terminal of the dual-port memory 132 and the output $d_o$ from the dual-port memory 132 is input to the D/A converter 129. The operation timings in this case is shown in FIG. 34. The controller 120 supplies a write address signal $ad_i$ and a read address signal $ad_o$ to the dual-port memory 132. The write address $ad_i$ is counted up at a low speed as indicated by a broken line in b) of FIG. 34 and the read address $ad_o$ is counted up at a high speed as indicated by a solid line in (b) of FIG. 34. The value of the read address signal $ad_o$ is set to the same value as the write address signal $ad_i$ at a positive going edge of the control signal $g_a$. The read address $ad_o$ may take any value the period not indicated.

The dual-port memory 132 writes the input address at the address specified by the write address signal $ad_i$ and reads out the data from the address specified by the read address signal, thereby providing the output data $d_o$. Thus, the data during the periods $a_0$, $a_1$, $a_2$, and $a_3$ in the output data $d_o$ shown in (d) of FIG. 34 are time-compressed data of the data during the periods $A_0$, $A_1$, $A_2$, and $A_3$ in the input data $d_i$ shown in (c) of FIG. 34.

By setting the count-up speed ratio $\beta'$ of the write address signal $ad_i$ to the read address signal $ad_o$ to $$\beta' > T < t_w$$

the information recorded on the audio tracks has an overlap portion between the adjacent tracks.

Incidentally, the control signal $g_a$, which has been set to have the same period as the control signal $g_v$, may have integer-times period as long as the latter.

An eighth embodiment of this invention will be explained. In this embodiment, there is provided a mode changing device for changing the period of the time-lapse recording into several modes. The compression ratio of the time-compressed audio signal is changed in accordance with the selected mode. The time-compressed audio signal is recorded and reproduced with several time-lapse recording periods.

Figure 35:
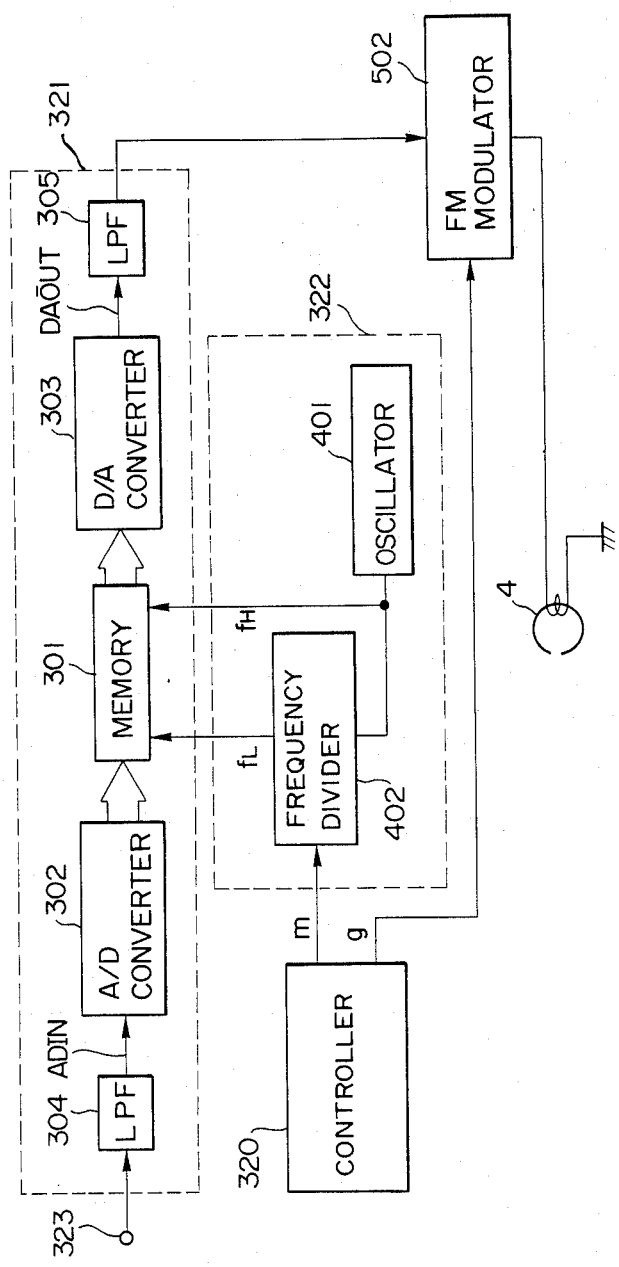
FIG. 35 is a block diagram of the circuit characteristic of an eighth embodiment of this invention.

FIG. 35 shows a characteristic portion of this embodiment (the construction and operation of the remaining portion are entirely the same as the first embodiment). Incidentally, an FM modulator 502 used in this embodiment comprises a gate circuit for controlling the recording current flowing through the head, a recording amplifier and a preamplifier circuit for emphasizing a high frequency range (these components are not shown).

In this embodiment, a controller 320 supplies to a compression ratio changing circuit 322 a mode changing signal m in accordance with a predetermined period of time-lapse recording. The compression ratio changing circuit 322 changes the compression ratio in a time compression circuit 321. For example, in the case where a video signal of 1/60 sec. is to be recorded at intervals of 4 sec., the compression ratio is selected to be 1/240 or less. Therefore, the input audio signal during the period of time-lapse recording is compressed within the time shorter than one field period and the time-compressed audio signal is recorded with the period equal to the time-lapse recording period. Thus, all items of audio signal information can be recorded on the magnetic tape in all the time-lapse recording modes.

In the time compression circuit 321, the input audio signal is sent from a terminal 323 through a low-pass filter 304, an A/D converter 302, a memory 301, a D/A converter 303, and a low-pass filter 305. The output signal from the low-pass filter 305 is sent to the audio rotary head 4 through the FM modulator 502. In the compression ratio changing circuit 322, the output signal from an oscillator 401 is supplied to a frequency divider 402. A high frequency clock signal $f_H$ which is the output signal from the oscillator 401 and a low frequency clock signal $f_L$ which is the output signal from the frequency divider 402 are supplied to the memory 301. The mode changing signal m and an audio recording gate signal g which are generated by the controller 320 are supplied to the frequency divider 402 and the FM modulator 502, respectively.

In operation, an input audio signal is bandlimited by the low-pass filter 304 and converted into a digital signal by the A/D converter 302. The digital signal is stored in the memory 301 by the low frequency clock signal $f_L$. The signal time-compressed by reading out it therefrom by the high frequency clock signal $f_H$ is restored to an analog signal by the D/A converter 306, and only the signal belonging to a required band is extracted through the low-pass filter 305. The time-compressed audio signal thus produced is frequency-modulated by the FM modulator 502 and recorded on the magnetic tape using the video rotary head 4. Then, this audio signal is time-lapse recorded with the same period as the period of time-lapse recording through the gate operation of the gate signal g.

The low-frequency clock signal $f_L$ is created by frequency-dividing the high frequency clock signal $f_H$ by the frequency divider 402. The compression ratio of the time-compressed audio signal is the frequency ratio of the high frequency clock signal $f_H$ to the low frequency clock signal $f_L$, i.e. the frequency dividing ratio in the divider 402. This frequency dividing ratio is changed, by the mode changing signal m into the value equal to or greater than the ratio of the time-lapse recording in the selected mode.

Figure 36A:
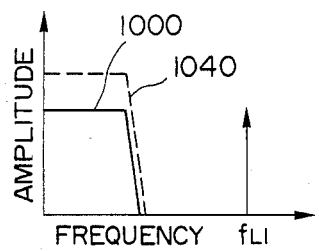
FIGS. 36A to 36D are spectrum diagrams of the signals at the points in the circuit of FIG. 35.
Figure 36C:
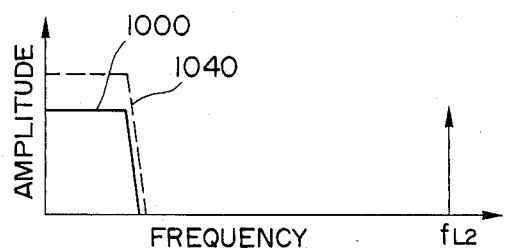
Figure 36B:
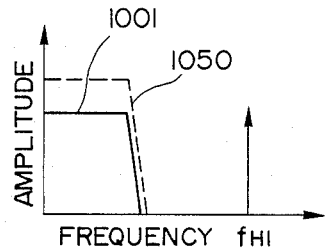
Figure 36D:
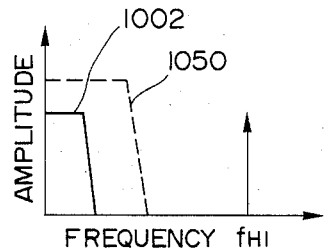

FIGS. 36A-D show spectrum diagrams on the sides of the input audio signal and the time-compressed audio signal. The abscissa represents a frequency and the ordinate represents a signal level. The maximum compression ratio in this embodiment is set to 240. FIGS. 36A and 36B are the spectrum diagrams of the input audio signal and the time-compressed audio signal in the mode of the compression ratio of 240, respectively. Likewise, FIGS. 36C and 36D are the spectrum diagrams in the mode of the compression ratio of 120. $f_{H1}$ is the frequency of the high frequency clock signal $f_H$ in the mode of the compression ratio 240. $f_{L1}$ is the frequency of the low frequency clock signal $f_L$ in the same mode. The abscissa in the spectrum diagram of the input audio signal is normalized by the frequency $f_{L1}$, and that in the time-compressed audio signal is normalized by the frequency $f_{H1}$. The abscissa in FIGS. 36C and 36D is also normalized in like manner.

The solid line 1000 in FIGS. 36A and 36C shows a spectrum of the input audio signal band-limited by the low-pass filter 304; and solid line 1001 in FIG. 36B shows a spectrum of the time-compressed audio signal in the mode of the compression ratio 240; the solid line 1002 in FIG. 36D shows a spectrum of the time-compressed audio signal in the mode of the compression ratio of 120; the broken line 1040 in FIGS. 36A and 36C shows a frequency characteristic of the low-pass filter 304; and the broken line in FIG. 36B shows a frequency characteristic of the low-pass filter 305. The frequency dividing ratio in the frequency divider 402 in the mode of the compression ratio of 120 is set to be half of that in the mode of the compression ratio of 240. Thus, in the mode of the compression ratio of 120 the frequency of the low frequency clock signal $f_L$ is the frequency $f_{L2}$ twice the frequency $f_{L1}$ as seen from FIG. 36C and the band width of the time-compressed audio signal is half that in the mode of the compression ratio of 240 as seen from FIG. 36D. The frequency of the high frequency clock signal $f_H$ remains the frequency $f_{H1}$ so that the frequency characteristic of the low-pass filter 304 is not required to be changed from the broken line 1050. This applies to any case where the compression ratio is reduced to a certain value.

In accordance with this embodiment, audio signal can be recorded in accordance with the changed period of time-lapse recording. The frequency characteristic of the low-pass filter is not required to be changed when the compression ratio is changed. Further, if the compression ratio is set to be small, the band width of the time-compressed audio signal is narrow so that it is less influenced by noise. Also the time-compressed audio signal occupies a smaller proportion of bandwidth for the high frequency or low frequency so that quantization noise also becomes small.

Figure 37:
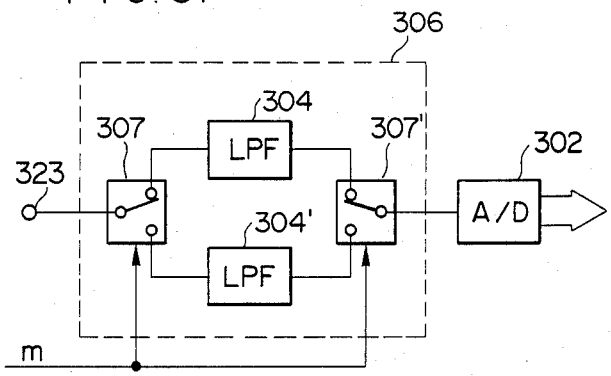
FIGS. 37, 39, 40 and 42 are block diagrams of the circuits characteristic of a modification of the eighth embodiment of this invention.

As a modification of this embodiment, the low-pass filter 304 may be replaced by a filter 306 including a plurality of low-pass filters as shown in FIG. 37. In this case, if a small compression ratio is selected, the low-pass filter 304 is switched to the low-pass filter 304' having a wider passband by low-pass filter switching circuits 307 and 307'.

Figure 38A:
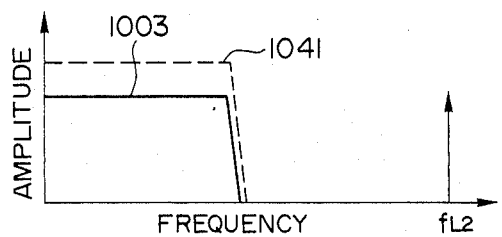
FIGS. 38A, 38B, 41A, 41B, 43A and 43B are spectrum diagrams of the signals at the several points in the above modification.
Figure 38B:
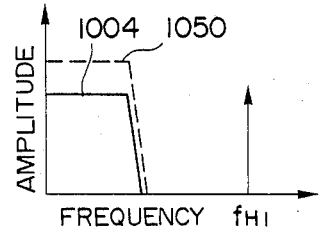

FIGS. 38A, B show the spectrum diagrams of the audio signal in the mode of the compression ratio of 120. The solid line 1003 in FIG. 38A shows a spectrum of the input audio signal band-limited by the low-pass filter 304'; the solid line 1004 in FIG. 38B shows a spectrum of the time-compressed audio signal; the broken line 1041 in FIG. 38A shows a frequency characteristic of the low-pass filter 304'; and the broken line 1050 in FIG. 38B shows the frequency characteristic of the low-pass filter 305 as mentioned above. In accordance with this alternative embodiment, the pass-band of the time-compressed audio signal can made wider in the mode of the small compression ratio than in the embodiment of FIG. 35.

Incidentally, in the case where a number of compression ratios are used, low-pass filters corresponding to the respective modes may be individually provided or only one low-pass filter operable in the respective mode may be provided.

Figure 39:
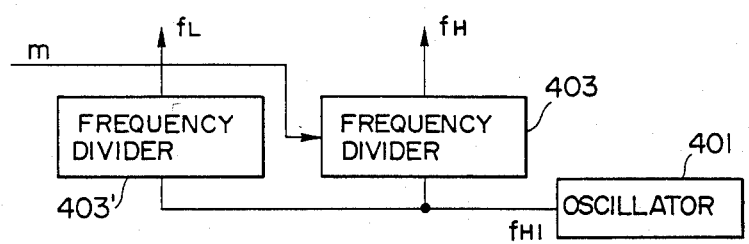
Figure 40:
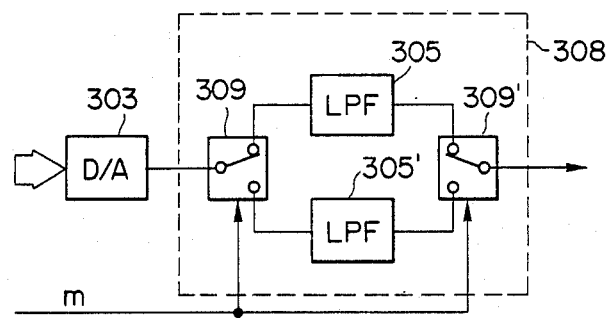

In another modification of the embodiment of FIG. 35, as shown in FIG. 39, the frequency dividing ratio in a frequency divider 402' which creates the low frequency clock signal $f_L$ from the output signal from the oscillator 401 may be previously fixed and that of the frequency divider 403 which creates the high frequency clock signal $f_H$ from the output signal from the oscillator 401 may be changed by the mode changing signal m. Further, as shown in FIG. 40, the low-pass filter 305 may be replaced by a filter 308 including a plurality of low-pass filters. In this case, if a small compression ratio is selected, the low-pass filter 305 is switched to the low-pass filter 305' having a narrower passband by low-pass filter switching circuits 309 and 309'.

Figure 41A:
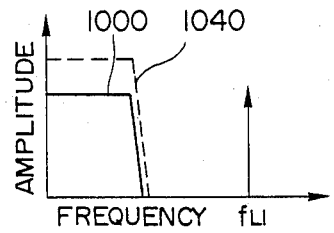
Figure 41B:
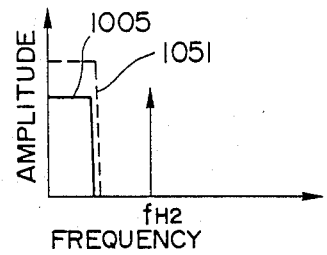

FIGS. 41A, B show a spectrum diagram of the audio signal in the mode of the compression ratio of 120. The solid line 1005 in FIG. 41B shows a spectrum of the time-compressed audio signal and the broken line 1051 shows a frequency characteristic of the low-pass filter 305'. In this case also, if a small compression ratio is selected, the band of the time-compressed audio signal becomes narrow, and noise in the head is decreased. Thus, the S/N ratio in the small time-lapse recording ratio is improved.

In the embodiment of FIG. 35 and its alternative embodiments, if a small compression ratio is selected, the memory capacity required may be small. The signal belonging to another channel can be stored in the remaining memory capacity. (This can be suitably adopted in stereophonic audio recording or the like.) Another channel signal may be recorded on the magnetic tape by another head or may be superposed on the time-compressed audio signal.

Figure 42:
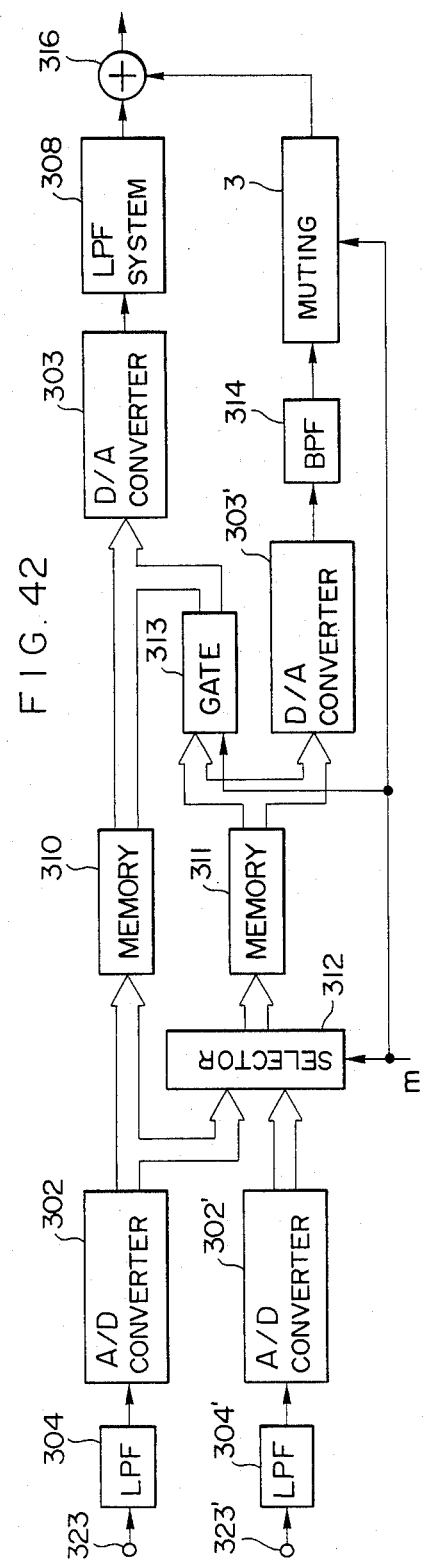

As a still another modification of this embodiment, FIG. 42 shows, in block form, a time-compression circuit used in frequency-superposing and recording another channel audio signal on a main channel audio signal. In the time compression circuit of FIG. 42, there are provided two memories 310, 311, a main channel audio signal processing circuit, and a sub-channel audio signal processing circuit including an input terminal 323' to which a sub-channel signal is input, a low-pass filter 304", an A/D converter 302', a D/A converter 303', a band-pass filter 314 and a muting circuit 315. The sub-channel signal is frequency-superposed on the main channel signal in an adder 316. In the mode of the time-lapse recording ratio of 240, a selector 312 selects the output signal from the A/D converter 302 and the gate circuit 313 is opened. Thus, the audio signal is time-compressed using both of the memories 310 and 311. Then, the muting circuit 315 operates to output only the main channel time-compressed audio signal. In the mode of the time-lapse recording ratio of 120, the selector 312 selects the sub-channel signal and the gate circuit 313 is closed. The main channel audio signal is time-compressed in the memory 310 and the sub-channel audio signal is time-compressed in the memory 311. The output signal from the D/A converter 303' is sent to the bandpass filter 314 to select the frequency converted signal of the sub-channel time-compressed signal. The sub-channel signal having passed through the muting circuit 315 is frequency-superposed on the main channel time-compressed audio signal.

Figure 43B:
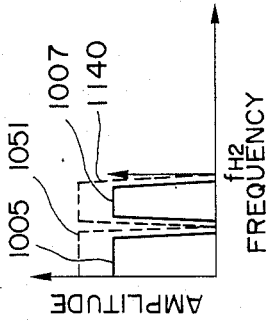
Figure 43A:
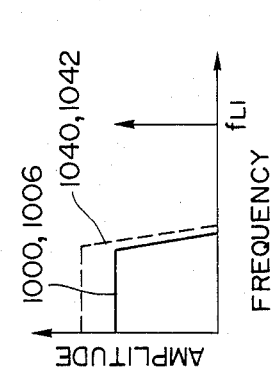

FIGS. 43A, B show spectrum diagrams of the audio signals. The solid line in FIG. 43A shows a spectrum of the sub-channel signal band-limited by the low-pass filter 304"; the solid line 1007 in FIG. 43B shows a spectrum of the sub-channel frequency-converted time-compressed audio signal; the broken line 1042 in FIG. 43A shows a frequency characteristic of the low-pass filter 304"; and the broken line in FIG. 43B shows a frequency characteristic of the band-pass filter 314.

In accordance with this embodiment, multi-channel audio signal recording in the mode of a small time-lapse recording ratio.

Examples of the compression ratio in the respective modes will be explained. In order to record all items of information of an input audio signal, the sound in the period of the time-lapse recording must be compressed within the time shorter than one field period. Therefor, if the compression ratio is set to the value greater than that in the mode having the maximum time-lapse recording period, the audio signal can be recorded without changing the compression ratio although use percentage of the audio tracks is varied. However, if the use percentage of the tracks is decreased to a certain degree, a time fluctuation of the audio signal will occur at the joining position of the time-compressed signals, thus deteriorating the sound quality. The time fluctuation within 2% can provide the desired sound quality. Since the maximum time fluctuation is 100 μsec. or so, the time-compressed audio signal should be 5 m sec. long. The track using percentage should be ⅓ or more. Thus, in this embodiment, the compression ratio in each mode is changed so that the track using percentage is ⅓ or more. Examples of the compression ratio in each mode are indicated in Table 1.

TABLE 1

| mode (times) | compression ratio | track using percentage (%) |
|---|---|---|
| 240 | 256 | 94 |
| 120 | 126 | 94 |
| 60 | 64 | 94 |
| 24 | 32 | 75 |
| 12 | 16 | 75 |
| 6 | 6 | 75 |

Figure 44A:
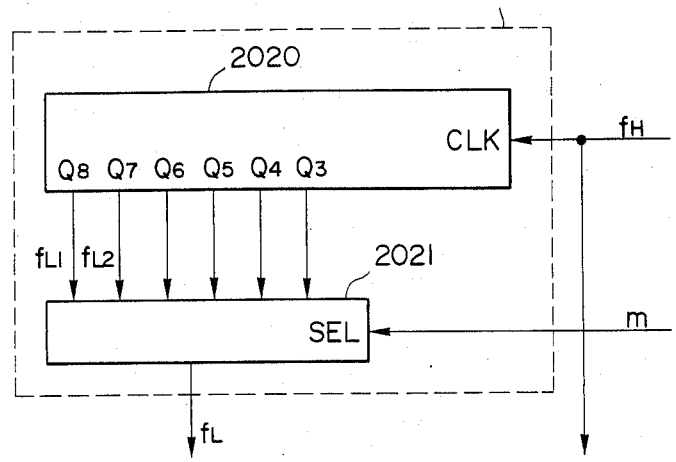
FIGS. 44A and 44B are detailed block diagrams of the compression ratio changing circuit in the eighth embodiment.
Figure 44B:
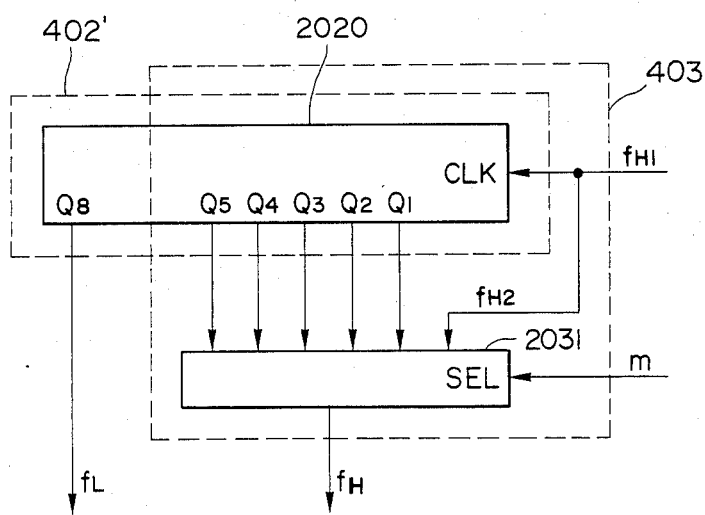

FIGS. 44A, B show a detailed block diagram of the compression ratio changing circuit used in this embodiment. FIG. 44A shows the frequency divider 402. In the frequency divider 402, a counter 2020 frequency-divides the high frequency clock signal $f_H$ and a low frequency clock signal selector circuit 2021 selects, in the 240 times mode, the output at a terminal $Q_8$ (dividing ratio of $2^8$) and selects, in the 120 times mode, the output at a terminal $Q_7$ (dividing ratio of $2^7$), thereby determining the low frequency clock signal $f_L$. FIG. 44B shows the frequency divider 402' and 403. The counter 2020 in the frequency divider 402' provides the low frequency clock signal $f_L$ at the terminal $Q_8$. A high frequency clock signal selector 2031 in the frequency divider 403 selects, in the 240 times mode, selects the input clock signal $f_{H1}$ itself and selects, in the 120 times mode, the high frequency clock signal $f_{H2}$ at the terminal $Q_1$ of the counter 2020, thereby determining the high frequency clock signal $f_H$.

In accordance with this embodiment, the compression ratio changing circuit can be impremented in a simplified circuit by setting the compression ratio to n-th (n: integer) powers of 2. Further, although the envelope level of the audio signal recorded on the ends of a track is generally reduced because of possible variation of the tape travel path, thus reducing the S/N ratio of the reproduced audio signal, in accordance with this embodiment, the desired sound quality free from the S/N ratio reduction can be provided since the audio signal is not recorded on the track ends.

Moreover, the compression ratio may be changed in only three stages since the track using percentage in each mode has only to be ⅓ or more as mentioned above, thereby simplifying the circuit construction.

TABLE 2

| mode (times) | compression ratio | track using percentage (%) |
|---|---|---|
| 240 | 256 | 94 |
| 120 |  | 47 |
| 60 | 64 | 94 |
| 24 |  | 38 |
| 12 | 16 | 75 |
| 6 |  | 38 |

As described above, in accordance with this invention, a time-compressed audio signal is recorded on a magnetic tape by a rotary head in a state where the magnetic tape is being stopped, so that the audio signal can be continuously recorded/reproduced in a time-lapse VTR without any interference between the audio signal and a video signal.

We claim:

1. An audio signal recording/reproducing system used in a time-lapse video tape recording device having driving means for shifting and stopping a magnetic tape at a predetermined period; a rotary drum on which the magnetic tape is mounted; first rotary magnetic head means arranged on the rotary drum, when the magnetic tape mounted on the rotary drum is being stopped, for recording a video signal on the magnetic tape to form video signal recording tracks thereon and for detecting the video signal from the video signal recording tracks; and a video signal recording/reproducing circuit, connected with the first rotary magnetic head, for sending the video signal to the first rotary magnetic head means and receiving the video signal detected by the first rotary magnetic head means therefrom, said audio signal recording/reproducing system comprising:

(a) analog-to-digital (A/D) converter circuit for receiving an audio signal and converting it into a digital audio signal;

(b) memory means, connected with said A/D converter circuit, for storing the digital audio signal supplied from the A/D converter circuit by a first clock signal having a first predetermined frequency and reading out the stored digital audio signal by a second clock signal having a higher frequency than the first frequency so as to produce a time-compressed audio signal;

(c) a digital-to-analog (D/A) converter circuit, connected with said memory means, for converting the time-compressed audio signal supplied from the memory means into a time-compressed analog audio signal;

(d) a second rotary magnetic head arranged on said rotary drum for recording, when the magnetic tape is being stopped, the time-compressed analog audio signal on the magnetic tape to form audio signal recording tracks in parallel to said video signal recording tracks, said second rotary magnetic head having a gap with a different azimuth angle from that of a gap of said first rotary magnetic head means; and (e) a controller circuit connected with said memory means for supplying said first and second clock signal to the memory means.

2. An audio signal recording/reproducing system according to claim 1, said system further comprising:
a frequency modulation circuit, connected between said D/A converter circuit and said second rotary magnetic head, for converting said time-compressed analog audio signal into a frequency-modulated audio signal.

3. An audio signal recording/reproducing system according to claim 1, wherein said second rotary magnetic head is located at a different height from said first rotary magnetic head.

4. An audio signal recording/reproducing system according to claim 1, wherein said first and second magnetic head means have widths larger than those of said video signal recording tracks and audio signal recording tracks, respectively.

5. An audio signal recording/reproducing system according to claim 1, wherein said memory means comprises first and second memories which alternately store the digital audio signal and alternately read out it.

6. An audio signal recording/reproducing system according to claim 3, wherein said video signal recording tracks and said audio signal recording tracks are simultaneously formed by said first and second rotary magnetic head means.

7. An audio signal recording/reproducing system according to claim 1, wherein said first and second rotary magnetic head means are located at the same height on said rotary drum, and said driving means shifts, after the video signal recording track is formed by said first rotary magnetic head means, the magnetic tape by a first predetermined distance and shifts, after the audio signal recording track is formed by said second rotary magnetic head means, the magnetic tape by a second predetermined distance.

8. An audio signal recording/reproducing system according to claim 1, wherein said controller circuit has frequency changing means for changing the frequency of said first clock signal.

9. An audio signal recording/reproducing system according to claim 1, wherein said controller circuit has frequency changing means for changing the frequency of said second clock signal.

10. An audio signal recording/reproducing system according to claim 1, wherein said memory means is a dual-port memory.

11. An audio signal recording/reproducing system according to claim 1, wherein said first rotary magnetic head means consists of a pair of magnetic heads located at the opposite positions on said rotary drum.

12. An audio signal recording/reproducing system according to claim 5, wherein said first and second memories store the digital audio signal in an overlapping manner.

13. An audio signal recording/reproducing system used in a time-lapse video tape recording device having driving means for shifting and stopping a magnetic tape at a predetermined period; a rotary drum on which the magnetic tape is mounted; first rotary magnetic head means arranged on the rotary drum for, when the magnetic tape mounted on the rotary drum is being stopped, recording a video signal on the magnetic tape to form video signal recording tracks thereon and for detecting the video signal from the video signal recording tracks; and a video signal recording/reproducing circuit connected with the first rotary magnetic head means and receiving the video signal detected by the first rotary magnetic head means therefrom, said audio signal recording/reproducing system comprising:
- (a) analog-to-digital (A/D) converter circuit for receiving an audio signal and converting it into a digital audio signal;
- (b) memory means connected with said A/D converter circuit for storing the digital audio signal supplied from the A/D converter circuit by a first clock signal having a first predetermined frequency and reading out the stored digital audio signal by a second clock signal having a second frequency so as to produce a time-compressed audio signal;
- (c) a digital-to-analog (D/A) converter circuit connected with said memory means for converting the time-compressed audio signal supplied from the memory means into a time-compressed analog audio signal;
- (d) a second rotary magnetic head arranged on said rotary drum for, when the magnetic tape is being stopped, recording the time-compressed analog audio signal on the magnetic tape to form audio signal recording tracks in parallel to said video signal recording tracks and reproducing the audio signal from the audio signal recording tracks;
- (e) switch means comprising a first switch, connected with said A/D converter, for selecting an audio signal supplied from an input terminal or the audio signal reproduced by said second rotary magnetic head to send it to said A/D converter, and a second switch, connected between said D/A converter and said first switch, for supplying said time-compressed audio signal to said second rotary magnetic head or for supplying the audio signal reproduced by said second rotary magnetic head; and
- (f) controller means, connected with said memory means, for supplying said first and second clock signals to the memory means.

14. An audio signal recording/reproducing system according to claim 13, said system further comprising: a frequency modulation circuit, connected between said D/A converter circuit and said second rotary magnetic head, for converting said time-compressed analog audio signal into a frequency-modulated audio signal.

15. An audio signal recording/reproducing system according to claim 13, wherein said second rotary magnetic head is located at a different height from said first rotary magnetic head.

16. An audio signal recording/reproducing system according to claim 13, wherein said first and second magnetic head means have widths larger than those of said video signal recording tracks and audio signal recording tracks, respectively.

17. An audio signal recording/reproducing system according to claim 13, wherein said memory means comprises first and second memories which alternately store the digital audio signal and alternately read out it.

18. An audio signal recording/reproducing system according to claim 15, wherein said video signal recording tracks and said audio signal recording tracks are simultaneously formed by said first and second rotary magnetic head means.

19. An audio signal recording/reproducing system according to claim 13, wherein said first and second rotary magnetic head means are located at the same height on said rotary drum, and said driving means shifts, after the video signal recording tracks is formed by said first rotary magnetic head means, the magnetic tape by a first predetermined distance and shifts, after the audio signal recording track is formed by said second rotary magnetic head means, the magnetic tape by a second predetermined distance.

20. An audio signal recording/reproducing system according to claim 13, wherein said controller circuit has frequency changing means for changing the frequency of said first clock signal.

21. An audio signal recording/reproducing system according to claim 13, wherein said controller circuit has frequency changing means for changing the frequency of said second clock signal.

22. An audio signal recording/reproducing system according to claim 13, wherein said memory means is a dual-port memory.

23. An audio signal recording/reproducing system according to claim 13, wherein said first rotary magnetic head means consists of a pair of magnetic heads located at the opposite positions on said rotary drum.

24. An audio signal recording/reproducing system, according to claim 17, wherein said first and second memories store the digital audio signal in an overlapping manner.

25. An audio signal recording/reproducing system used in a time-lapse video tape recording device having driving means for shifting and stopping a magnetic tape at a predetermined period; a rotary drum on which the magnetic tape is mounted; rotary magnetic head means arranged on the rotary drum, when the magnetic tape mounted on the rotary drum is being stopped, for recording a video signal on the magnetic tape to form video signal recording tracks thereon and for detecting the video signal from the video signal recording tracks; and a video signal recording/reproducing circuit, connected with the first rotary magnetic head, for sending the video signal to the rotary magnetic head means and receiving the video signal detected by the rotary magnetic head means therefrom, said audio signal recording/reproducing system comprising:
- (a) analog-to-digital (A/D) converter circuit for receiving an audio signal supplied to an input terminal and converting it into a digital audio signal;
- (b) memory means, connected with said A/D converter circuit, for storing the digital audio signal supplied from the A/D converter circuit by a first clock signal having a first predetermined frequency and reading out the stored digital audio signal by a second clock signal having a higher frequency than the first frequency so as to produce a time-compressed audio signal;

(c) a digital-to-analog (D/A) converter circuit, connected with said memory means, for converting the time-compressed audio signal supplied from the memory means into a time-compressed analog audio signal;

(d) switch means, connected with said rotary magnetic head and said digital-to-analog converter circuit, for selectively switching said analog audio signal and said video signal to send the selected signal to said rotary magnetic head means therefrom; and (e) controller circuit, connected with said memory means, for supplying said first and second clock signals to the memory means, wherein said rotary magnetic head, each when the magnetic tape is stopped by said driving means, alternately records the video signal and the analog audio signal to form video recording tracks and audio recording tracks arranged in parallel to each other.

26. An audio signal recording/reproducing system according to claim 25, wherein said video signal recording/reproducing circuit has a field memory for recording a one-field video signal which stores the video signal detected by said rotary magnetic head and delays the video signal to be output by one field period.

* * * * *